(12) United States Patent
Sekiguchi

(10) Patent No.: US 7,515,192 B2
(45) Date of Patent: Apr. 7, 2009

(54) IMAGE REPRODUCING APPARATUS AND METHOD FOR REPRODUCING IMAGE

(75) Inventor: Tomohiro Sekiguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 811 days.

(21) Appl. No.: 10/970,486

(22) Filed: Oct. 21, 2004

(65) Prior Publication Data

US 2005/0089301 A1    Apr. 28, 2005

(30) Foreign Application Priority Data

Oct. 28, 2003    (JP)    ............................. 2003-367655

(51) Int. Cl.
*H04N 5/222*    (2006.01)
(52) U.S. Cl. .............................. 348/333.05; 348/333.01
(58) Field of Classification Search ................. 348/333, 348/333.05, 333.01, 333.02, 312; 715/790
See application file for complete search history.

(56) References Cited

U.S. PATENT DOCUMENTS 6,549,236 B2 *    4/2003    Oeda et al.    .............    348/333.05
6,781,629 B2 *    8/2004    Ohnogi    ...................    348/333.01
7,015,965 B2 *    3/2006    Asada et al.    .................    348/312

FOREIGN PATENT DOCUMENTS

JP    2001-211408 A    8/2001

* cited by examiner

*Primary Examiner*—Nhan T Tran
*Assistant Examiner*—Mekonnen Dagnew
(74) *Attorney, Agent, or Firm*—Canon U.S.A. Inc., I.P. Division

(57) ABSTRACT

An image reproducing apparatus includes a selecting device, such as a button, a reproducing unit, and a display unit. The selecting device is used to select one of a first image display mode and a second image display mode. The reproducing unit reproduces four reduced images from a memory if the first image display mode is selected, and reproduces nine reduced images from the memory if the second image display mode is selected. The display unit displays the four reduced images in T period if the first image display mode is selected, and displays the nine reduced images in the T period if the second image display mode is selected, wherein each of the four reduced images is displayed for each T/4 period, and each of the nine reduced images is displayed for each T/9 period.

10 Claims, 9 Drawing Sheets

IMAGE REPRODUCING APPARATUS AND METHOD FOR REPRODUCING IMAGE

This application claims priority from Japanese Patent Application No. 2003-367655 filed Oct. 28, 2003, which is hereby incorporated by reference herein.

BACKGROUND OF THE INVENTION

1. Field of the Invention

The present invention relates to an apparatus and method for reproducing a plurality of reduced images.

2. Description of the Related Art

A typical image reproducing apparatus, such as a digital camera and a camcorder having functions of both a camera and a video tape recorder (VTR), can display images in a forward or reverse direction on a display screen. In addition, the images may be displayed in various modes, for example, a multi-frame display (index display) mode in which the display screen is divided into a plurality of display areas for displaying different images individually at the same time and a slide show display mode in which the recorded images are successively displayed on the display screen.

Apparatuses that can display images in the forward or reverse direction as described above often have a fast forward/fast reverse function. In the fast forward/fast reverse function, the images may be fast forwarded or fast reversed in the form of thumbnails to increase the speed of an image update process or a plurality of reduced images may be displayed simultaneously for selecting an image to be displayed after the fast forward/fast reverse process is finished (for example, Japanese Patent Laid-Open No. 2001-211408).

However, there is a drawback in that it is difficult to recognize the images if the fast forwarding/fast reversing speed is too fast, and the user may become irritated if the update time is too long.

SUMMARY OF THE INVENTION

An object of the present invention is to overcome the above-described drawbacks.

Another object of the present invention is to improve the image display of a plurality of reduced images.

A preferred embodiment of the present invention provides an image reproducing apparatus including a reproducing unit for reproducing a plurality of reduced images recorded in a memory medium and a selecting unit for selecting one of a first image display mode in which M (M is an integer of 2 or more) reduced images are displayed in a predetermined period and a second image display mode in which N (N>M) reduced images are displayed in the predetermined period.

Another preferred embodiment of the present invention provides an image reproducing apparatus including a reproducing unit for reproducing a plurality of reduced images recorded in a memory medium and a selecting unit for selecting one of a first image display mode in which four reduced images are displayed in a predetermined period and a second image display mode in which nine reduced images are displayed in the predetermined period.

Another preferred embodiment of the present invention provides a method for reproducing images, the method including the steps of reproducing a plurality of reduced images recorded in a memory medium and selecting one of a first image display mode in which M (M is an integer of 2 or more) reduced images are displayed in a predetermined period and a second image display mode in which N (N>M) reduced images are displayed in the predetermined period.

Another preferred embodiment of the present invention provides a method for reproducing images, the method comprising the steps of reproducing a plurality of reduced images recorded in a memory medium and selecting one of a first image display mode in which four reduced images are displayed in a predetermined period and a second image display mode in which nine reduced images are displayed in the predetermined period.

Other features and advantages of the invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate an embodiment of the invention and, together with the description, serve to explain the principles of the invention.

DETAILED DESCRIPTION OF EMBODIMENTS

Embodiments of the invention will be described in detail below with reference to the drawings.

Figure 1:
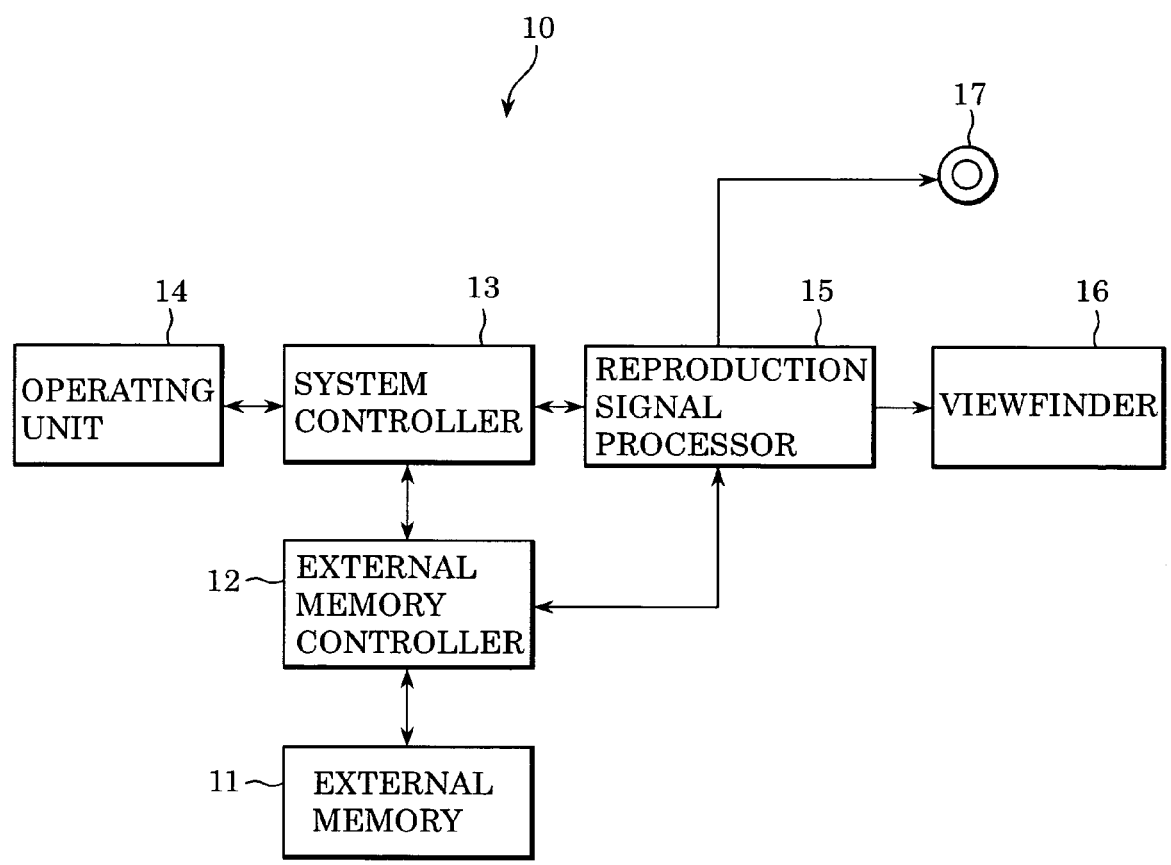
FIG. 1 is a block diagram showing the structure of the main part of an image reproducing apparatus according to an embodiment of the present invention.

FIG. 1 is a block diagram showing the structure of the main part of an image reproducing apparatus according to an embodiment of the present invention.

With reference to FIG. 1, an image reproducing apparatus 10 is, for example, a digital camera, a camcorder having functions of both a camera and a video tape recorder (VTR), or the like, and includes an external memory 11, such as a detachable semiconductor memory and a disc memory, for storing image data and an external memory controller 12 which controls processes of writing the image data into the external memory 11 and reading the image data from the external memory 11.

A system controller 13 controls the overall system of the image reproducing apparatus 10, and an operator operates the image reproducing apparatus 10 through an operating unit 14.

A reproduction signal processor 15 generates a reproduction signal used for reproducing images on the basis of the image data obtained from the external memory controller 12. A viewfinder (display unit) 16 displays the images on the basis of the reproduction signal from the reproduction signal processor 15, and a reproduction signal output unit 17 outputs the reproduction signal from the reproduction signal processor 15.

Figure 2A:
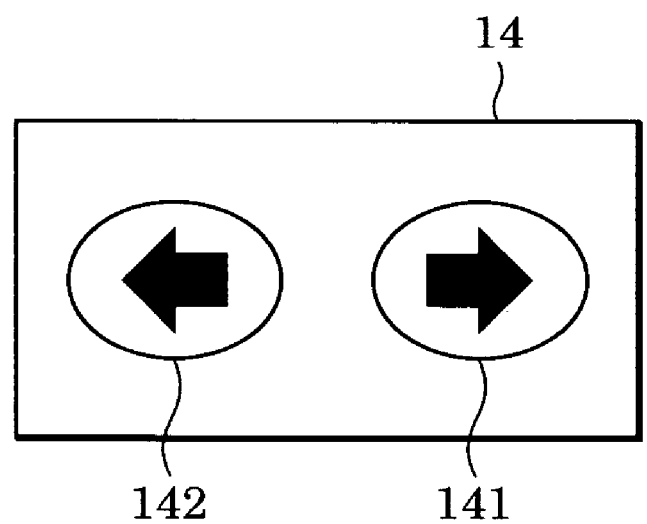
FIG. 2A is a schematic plan view of an operating unit shown in FIG. 1
Figure 2B:
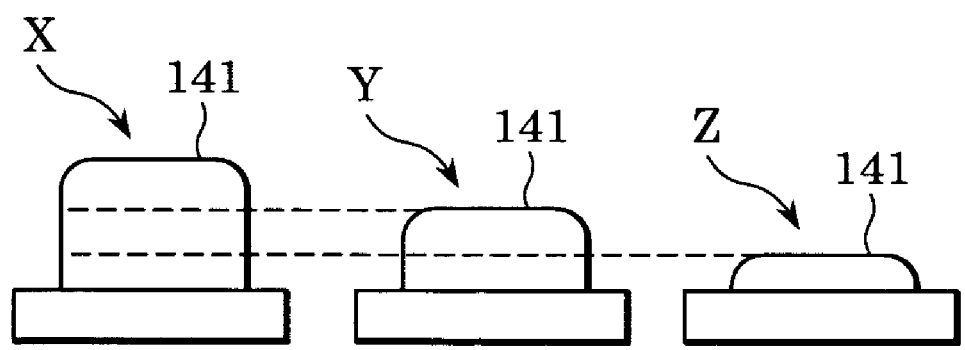
FIG. 2B is a schematic diagram showing the operational states of a button included in the operating unit.

The operating unit 14 includes buttons that can sense pressures and serves different functions depending on whether the buttons are half-pressed or fully pressed. FIGS. 2A and 2B are schematic diagrams showing the operating unit 14.

FIG. 2A is a schematic plan view of the operating unit 14 shown in FIG. 1 and FIG. 2B is a schematic diagram showing the operational states of a button included in the operating unit 14.

With reference to FIG. 2A, a fast forward button 141 is used for fast forwarding the images in the order of the time of recording and a fast reverse button 142 is used for fast reversing the images in the opposite order. When the buttons 141 and 142 are pressed, thumbnail images corresponding to the image data stored in the external memory 11 are successively read out by the external memory controller 12, and are displayed on the viewfinder 16. In addition, the reproduction signal may be output from the reproduction signal output unit 17.

FIG. 2B shows side views of the fast forward button 141 in different operational states. In this figure, the fast forward button 141 is in an unpressed state X, a half-pressed state Y, and a fully pressed state Z in that order from left to right.

When the operator presses the fast forward button 141 of the operating unit 14 halfway down (when the button is in the half-pressed state Y), the system controller 13 performs fast forwarding of the images on the viewfinder 16 in a low speed fast forward mode at a predetermined speed (first speed). When the operator presses the fast forward button 141 all the way down (when the button is in the fully pressed state Z), the system controller 13 performs fast forwarding of the images on the viewfinder 16 in a high speed fast forward mode at a speed (second speed) higher than the first speed used in the low speed fast forward mode.

Operations performed depending on the operational states of the fast reverse button 142 are similar to the above-described fast forward modes, except the images are displayed in the opposite order. Accordingly, when the fast reverse button 142 is pressed halfway down (when the button is in the half-pressed state Y), the system controller 13 performs fast reversing of the images on the viewfinder 16 in a low speed fast reverse mode at a predetermined speed (third speed). When the fast reverse button 142 is pressed all the way down (when the button is in the fully pressed state Z), the system controller 13 performs fast reversing of the images on the viewfinder 16 in a high speed fast reverse mode at a speed (fourth speed) higher than the third speed used in the low speed fast reverse mode.

In the low speed fast forward mode, a display screen of the viewfinder 16 or a display device (not shown) connected to the reproduction signal output unit 17 is divided into four display areas, and the images are fast forwarded by displaying four different images in the display areas individually (4-frame display method). In addition, in the high speed fast forward mode, the display screen is divided into nine display areas and the images are fast forwarded in a similar manner (9-frame display method).

Figure 3:
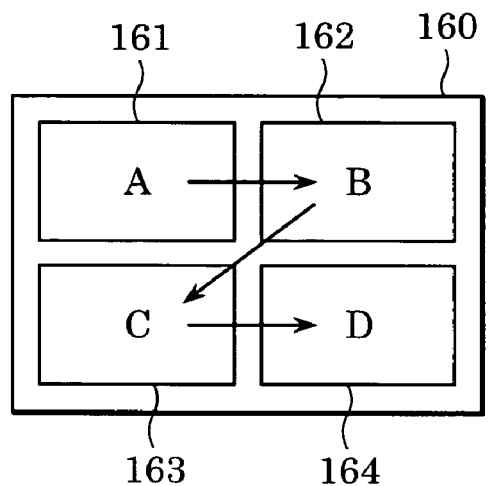
FIG. 3 is a diagram for explaining a 4-frame display method applied in a low speed fast forward mode.

FIG. 3 is a diagram for explaining the 4-frame display method applied in the low speed fast forward mode.

When the fast forward button 141 is pressed halfway down (when the button is in the half-pressed state Y) as shown in FIG. 2B, the low speed fast forward mode is selected and a display screen 160 of the viewfinder 16 is divided into four display areas 161, 162, 163, and 164.

In the low speed fast forward mode, the four display areas 161, 162, 163, and 164 display an image A (display area 161), an image B (display area 162), an image C (display area 163), and an image D (display area 164) in that order. In the low speed fast reverse mode, opposite to the low speed fast forward mode, the images are displayed in the order of the image D (display area 164), the image C (display area 163), the image B (display area 162), and the image A (display area 161).

Figure 4:
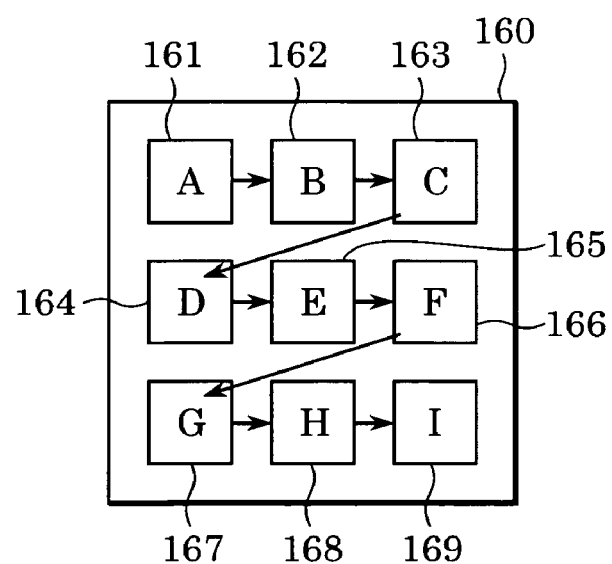
FIG. 4 is a diagram for explaining a 9-frame display method applied in a high speed fast forward mode.

FIG. 4 is a diagram for explaining the 9-frame display method applied in the high speed fast forward mode.

When the fast forward button 141 is pressed all the way down (when the button is in the fully-pressed state Z) as shown in FIG. 2B, the high speed fast forward mode is selected and the display screen 160 of the viewfinder 16 is divided into nine display areas 161, 162, 163, 164, 165, 166, 167, 168, and 169.

In the high speed fast forward mode, the nine display areas 161, 162, 163, 164, 165, 166, 167, 168, and 169 display an image A (display area 161), an image B (display area 162), an image C (display area 163), an image D (display area 164), an image E (display area 165), an image F (display area 166), an image G (display area 167), an image H (display area 168), and an image I (display area 169), in that order. In the high speed fast reverse mode, opposite to the high speed fast forward mode, the images are displayed in the order of the image I (display area 169), the image H (display area 168), the image G (display area 167), the image F (display area 166), the image E (display area 165), the image D (display area 164), the image C (display area 163), the image B (display area 162), and the image A (display area 161).

Figure 5:
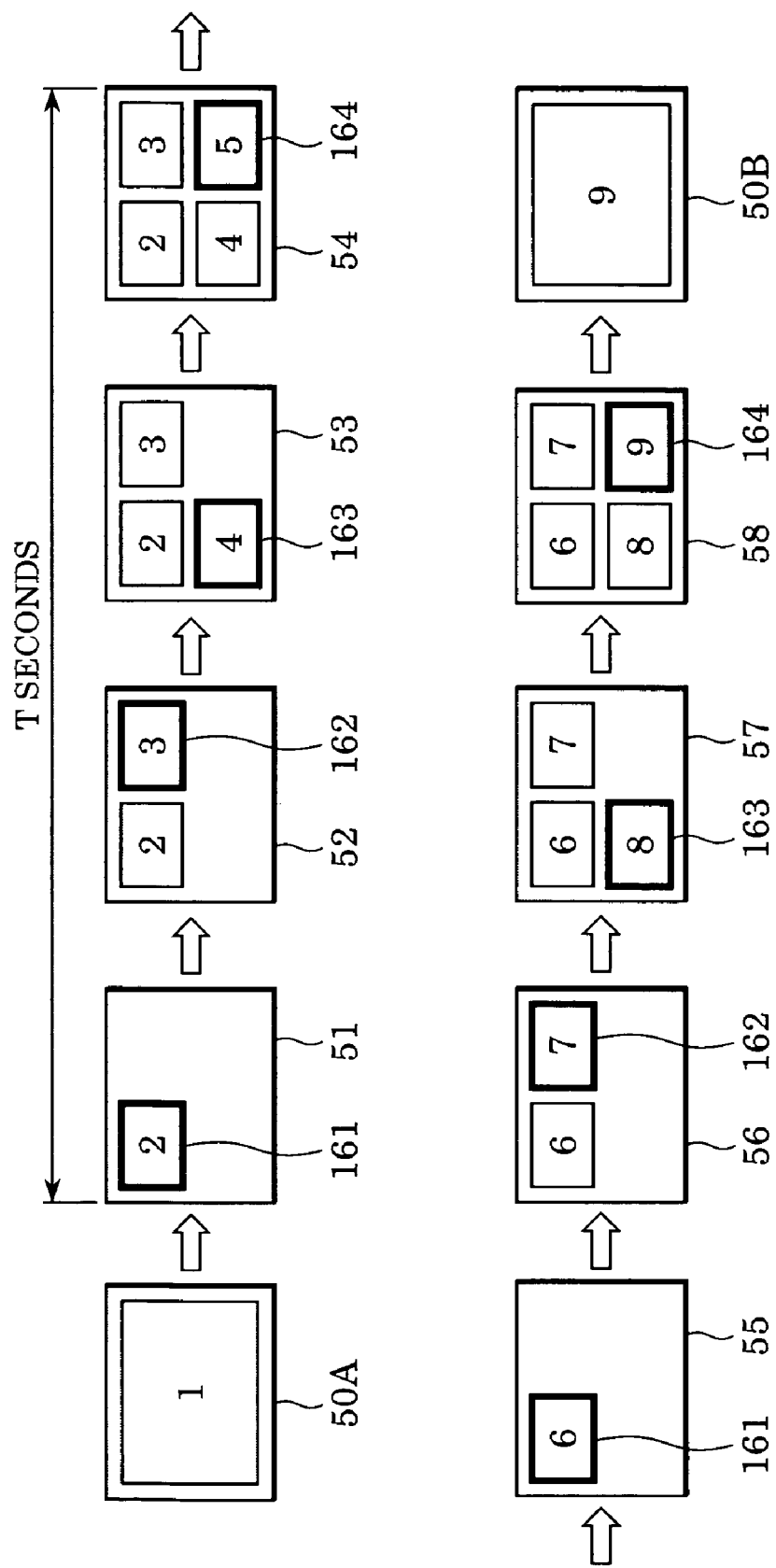
FIG. 5 is a diagram for explaining the manner in which images are displayed in the 4-frame display method shown in FIG. 3.

FIG. 5 is a diagram for explaining the manner in which the images are displayed in the 4-frame display method shown in FIG. 3.

FIG. 5 shows an example in which nine images (1 to 9) are displayed in the low speed fast forward mode. First, in display 50A, a first image 1 is displayed in a full-screen size. Then, in display 51, the 4-frame display screen shown in FIG. 3 appears and a reduced image (thumbnail image) 2 is displayed in the display area 161. Then, the display is successively updated to display 52 in which a reduced image 3 is displayed in the display area 162 in addition to the reduced image 2, display 53 in which a reduced image 4 is displayed in the display area 163, and display 54 in which a reduced image 5 is displayed in the display area 164. The total display time in which the displays 51 to 54 are presented is T seconds; accordingly, a display time (update time) for each of the displays 51 to 54 is T/4 seconds in the 4-frame display.

Then, the display is further updated to display 55 in which the reduced images 2 to 5 are cleared and a reduced image 6 is newly displayed in the display area 161, display 56 in which a reduced image 7 is displayed in the display area 162, display 57 in which a reduced image 8 is displayed in the display area 163, and display 58 in which a reduced image 9 is displayed in the display area 164. After the display 58 is presented for T/4 seconds, the 4-frame display is finished and the last image 9 is displayed in a full screen size in display 50B.

Figure 6:
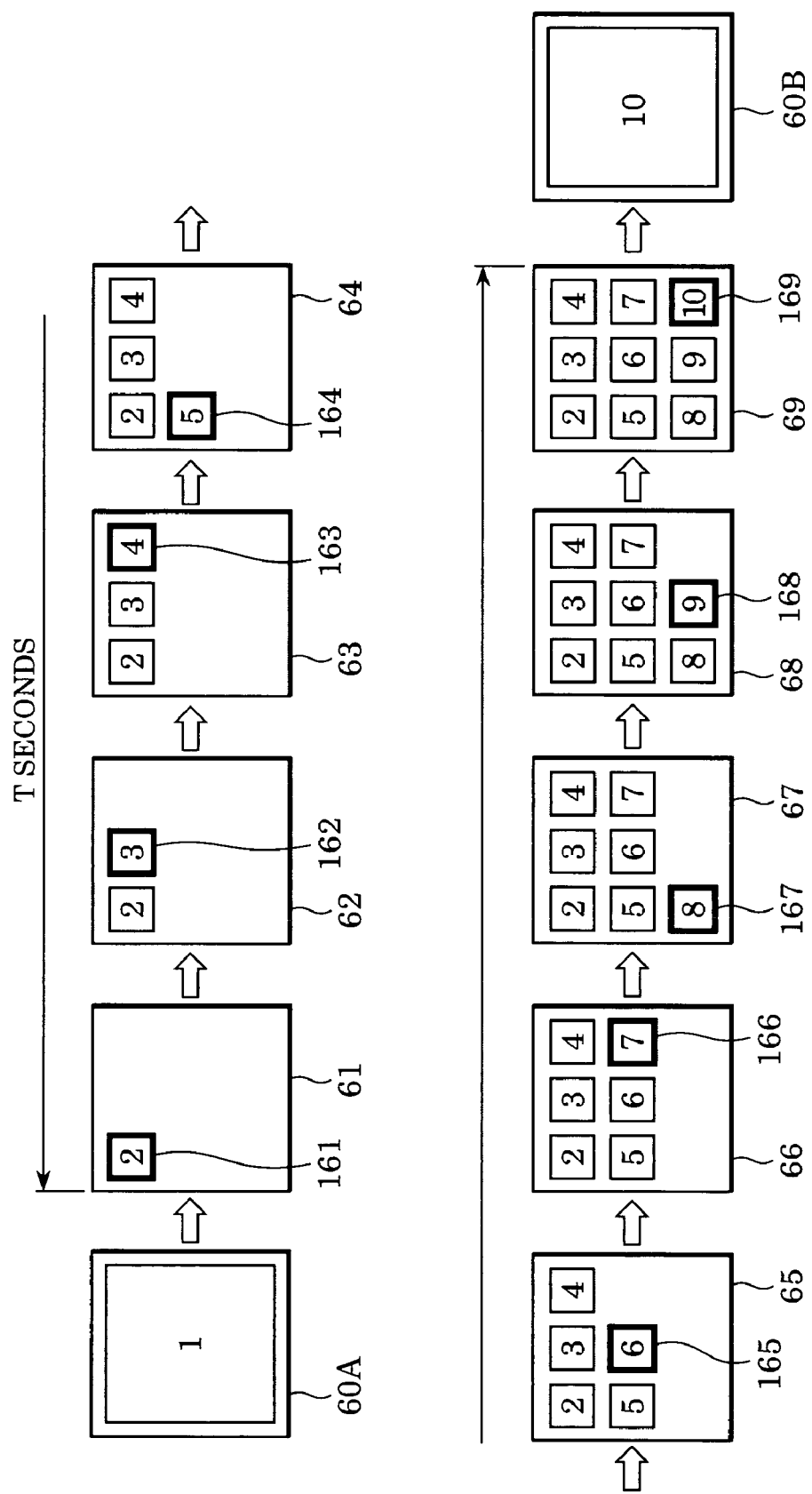
FIG. 6 is a diagram for explaining the manner in which images are displayed in the 9-frame display method shown in FIG. 4.

FIG. 6 is a diagram for explaining the manner in which the images are displayed in the 9-frame display method shown in FIG. 4.

FIG. 6 shows an example in which ten images (1 to 10) are displayed in the high speed fast forward mode. First, in display 60A, a first image 1 is displayed in a full screen size. Then, in display 61, the 9-frame display screen shown in FIG. 4 appears and a reduced image 2 is displayed in the display area 161. Then, the display is successively updated to display 62 in which a reduced image 3 is displayed in the display area 162 in addition to the reduced image 2, display 63 in which a reduced image 4 is displayed in the display area 163, display 64 in which a reduced image 5 is displayed in the display area 164, and display 65 in which a reduced image 6 is displayed in the display area 165. Similarly, reduced images 7 to 10 are successively displayed in the display areas 166 to 169, respectively. Then, after the reduced image 10 is displayed in the display area 169, the 9-frame display is finished and the last image 10 is displayed in a full screen size in display 60B. The total display time in which the displays 61 to 69 are presented is T seconds, similar to the 4-frame display. Therefore, the display time (update time) for each of the displays 61 to 69 is T/9 seconds in the 9-frame display. When eleven or more images are to be displayed, the reduced images 2 to 10 are cleared after the display 69 is presented for T/9 seconds and a reduced image 11 (not shown) is newly displayed in the display area 161. Then, the display is updated every T/9 seconds in the above-described manner.

Figure 7:
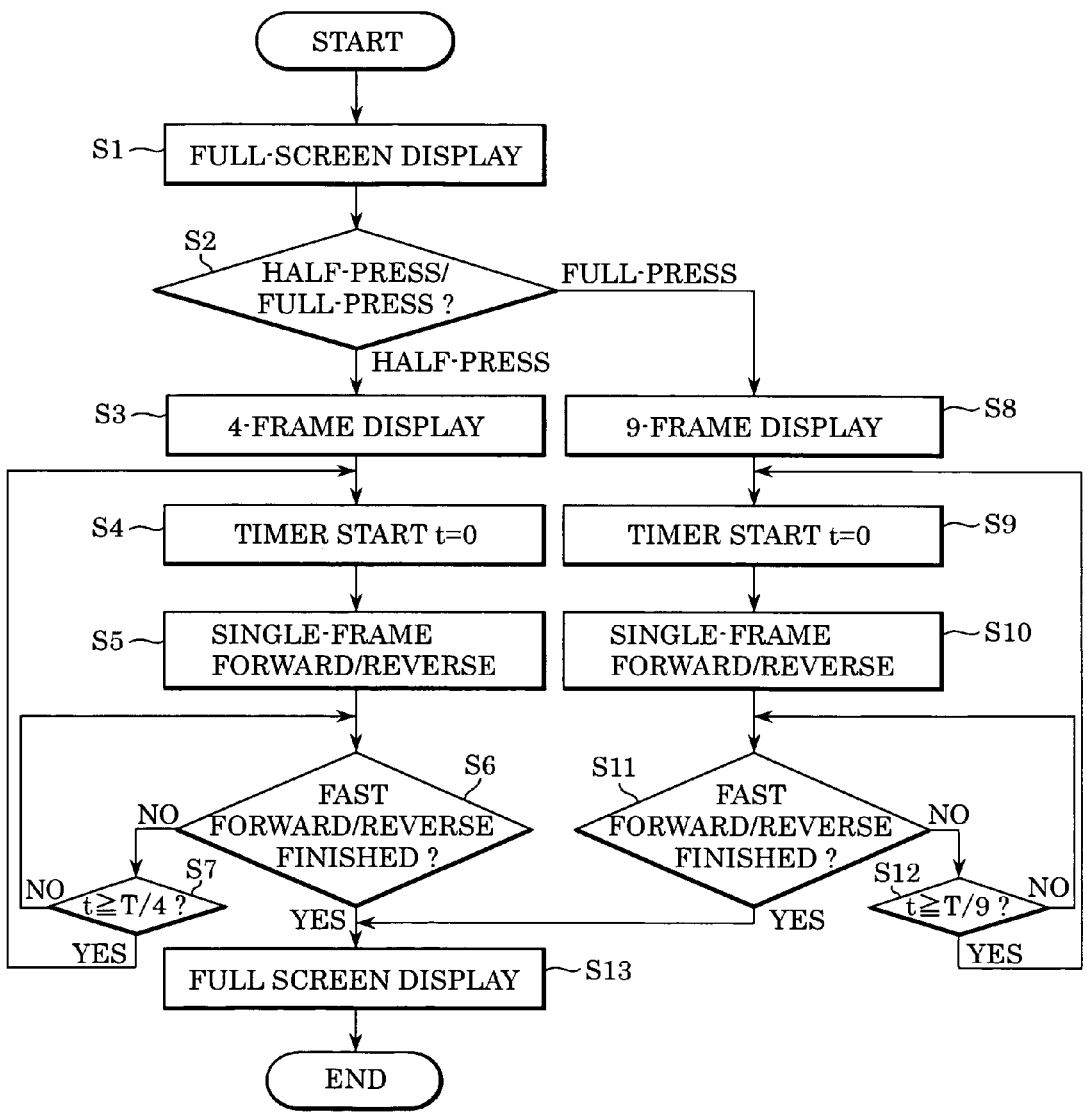
FIG. 7 is a flowchart of an image reproducing/displaying process performed by the image reproducing apparatus.

FIG. 7 is a flowchart of an image reproducing/displaying process performed by the image reproducing apparatus.

First, an image is displayed in a full screen size in a normal reproducing process (Step S1). Then, it is determined whether the fast forward button 141 (or the fast reverse button 142) is in the half-pressed state or the fully pressed state (Step S2). Accordingly, one of the low speed fast forward mode and the high speed fast forward mode (or one of the low speed fast reverse mode and the high speed fast reverse mode) is selected.

When the fast forward button 141 (or the fast reverse button 142) is in the half-pressed state, the low speed fast forward mode (or the low speed fast reverse mode) is selected and the 4-frame display is started (Step S3).

Next, a timer for controlling an image update time is started (Step S4). The image update time is the period at which the 4-frame display is updated as shown in FIG. 5, that is, for example, the time period for updating the display 51 to the display 52, the display 52 to the display 53, and so on. Accordingly, the image update time refers to the display time of each display on the 4-frame display screen before it is updated.

Next, in the fast forward mode, an image next to the one being displayed is displayed in a reduced size (Step S5). This corresponds to the display 51 in FIG. 5. In the fast reverse mode, an image previous to the one being displayed is displayed in a reduced size.

Next, it is determined whether or not the fast forward (or the fast reverse) operation is finished (Step S6). The determination is performed by detecting whether or not the fast forward button 141 (or the fast reverse button 142) is being pressed continuously. If the fast forward (or the fast reverse) operation is not finished, it is determined whether or not a predetermined time has been elapsed since the start of the timer (Step S7). As described above, in the low speed fast forward mode, the predetermined time is T/4 seconds. If it is determined that the predetermined time (T/4 seconds) has elapsed, the process returns to Step S4 and the timer is restarted. In addition, the next image is displayed in a predetermined display area of the 4-frame display (Step S5). This corresponds to the display 52 in FIG. 5.

If it is determined that the fast forward (or the fast reverse) operation is finished in Step S6, the 4-frame display is changed to the full screen display (Step S13) and the process ends.

If it is determined that the fast forward button 141 (or the fast reverse button 142) is in the fully pressed state in Step S2, the high speed fast forward mode (or the high speed fast reverse mode) is selected and the 9-frame display is started (Step S8).

Next, similar to Step S4, a timer for controlling the update time of the images is started (Step S9). Then, in the fast forward mode, an image next to the one being displayed is displayed in a reduced size (Step S10). This corresponds to the display 61 in FIG. 6. In the fast reverse mode, an image previous to the one being displayed is displayed in a reduced size.

Next, it is determined whether or not the fast forward (or the fast reverse) operation is finished (Step S11). If the fast forward (or the fast reverse) operation is not finished, it is determined whether or not a predetermined time has been elapsed since the start of the timer at Step S9 (Step S12). As described above, in the high speed fast forward mode, the predetermined time is T/9 seconds. If it is determined that the predetermined time (T/9 seconds) has elapsed, the process returns to Step S9 and the timer is restarted. In addition, the next image is displayed in a predetermined display area of the 9-frame display screen (Step S10). This corresponds to the display 62 in FIG. 6.

If it is determined that the fast forward (or the fast reverse) operation is finished in Step S11, the 9-frame display is changed to the full screen display (Step S13) and the process ends.

Next, a case will be described in which a process for displaying each image in the multi-frame display do not finish within the predetermined time in the above-described image reproducing method.

Figure 8:
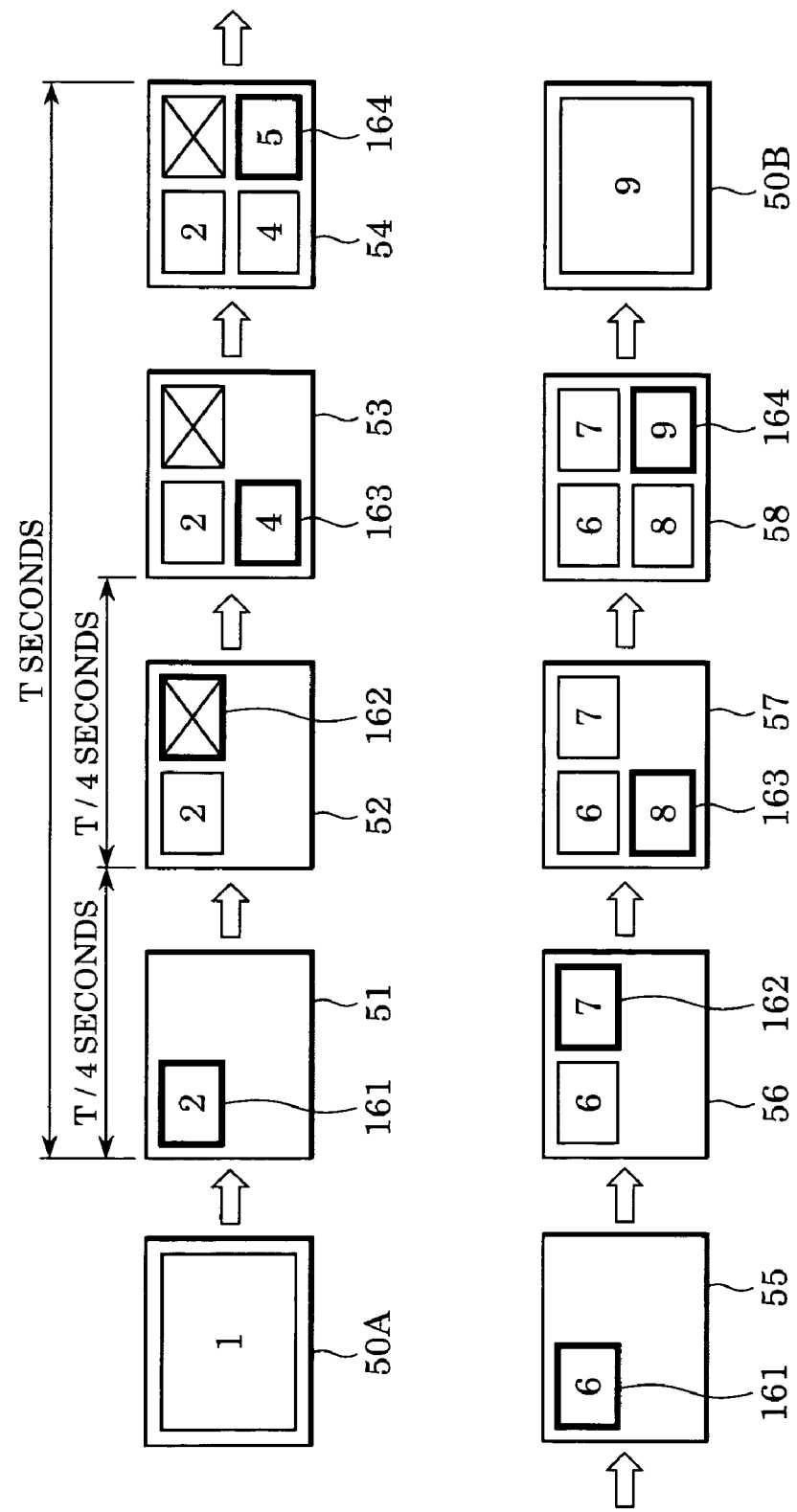
FIG. 8 is a diagram showing the time period at which the images are displayed in the 4-frame display.
Figure 9:
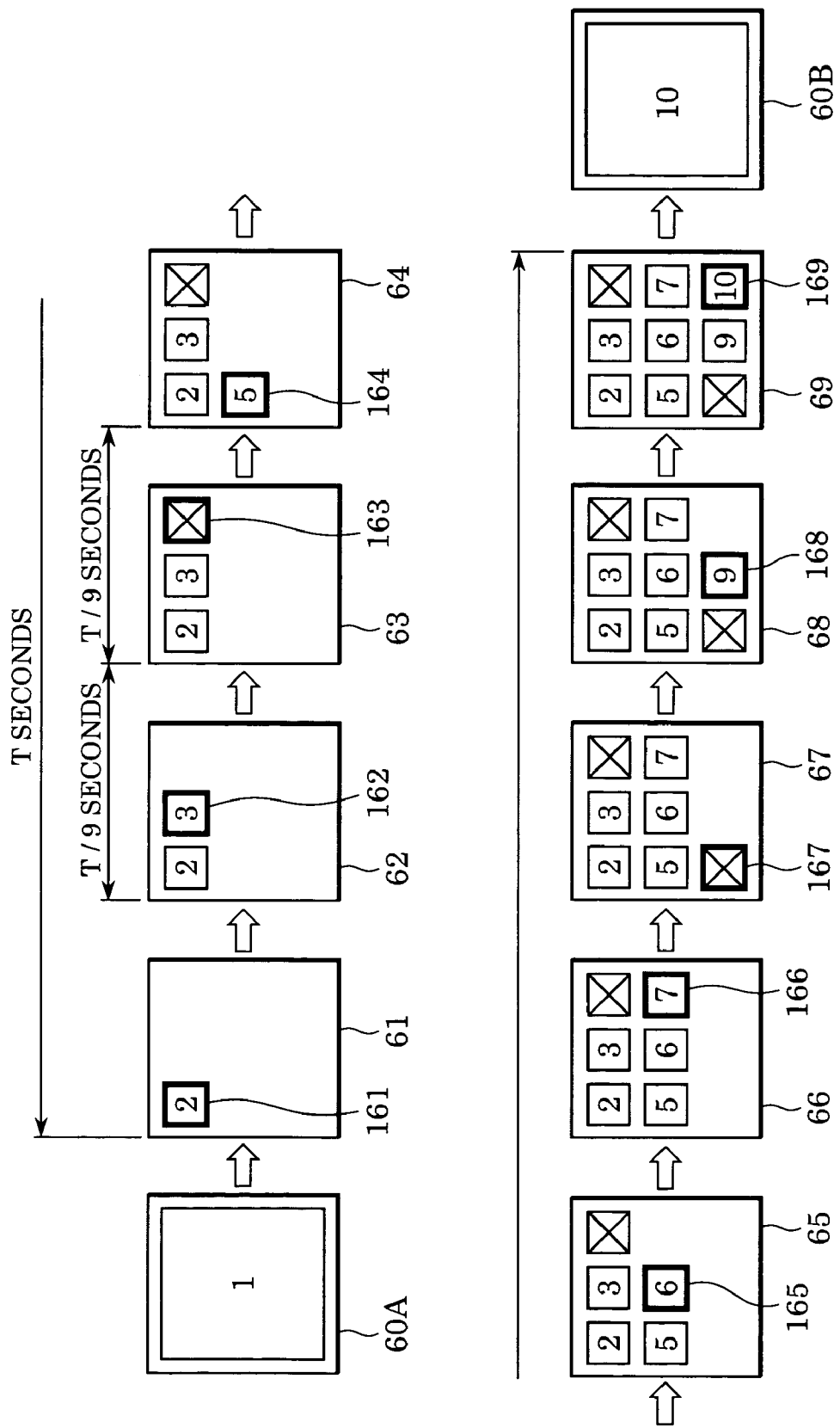
FIG. 9 is a diagram showing the time period at which the images are displayed in the 9-frame display.

FIG. 8 is a diagram showing the time period at which the images are displayed in the 4-frame display, and FIG. 9 is a diagram showing the time period at which the images are displayed in the 9-frame display.

The display time in which the displays 51 to 54 are presented in the 4-frame display, that is, the time from when an image is displayed in the first display area of the four display areas until when the display is updated after an image is displayed in the fourth display area is T seconds. In addition, the display time in which the displays 61 to 69 are presented in the 9-frame display, that is, the time from when an image is displayed in the first display area of the nine display areas until when the display is updated after an image is displayed in the ninth display area is also T seconds. Therefore, the display time for each display is T/4 seconds in the 4-frame display, and is T/9 seconds in the 9-frame display.

As described above with reference to FIG. 5, in FIG. 8, first, the first image 1 is displayed in the display 50A in a full screen size. Then, in the display 51, the 4-frame display screen appears and the reduced image 2 is displayed in the image area 161. The display time of the display 51 is T/4 seconds. When the reduced image 2 is displayed, a process for displaying the image 3 in the display area 162 is started at the same time. However, if this process does not finish in T/4 seconds, a blank or a symbol "×" indicating the state that the image 3 cannot be displayed is shown in the display area 162, and an image display process for the next image is started.

Then, if the process for displaying the image 4 in the display area 163 is finished within the next T/4 seconds, the image 4 is displayed in the display area 163, as shown in the figure. Similarly, the image 5 is displayed in the display area 164. Then, if the process for displaying the image 6 is finished within T/4 seconds after the image 5 has been displayed, the images 2 to 5 displayed in the display area 161 to 164, respectively, are cleared and the image 6 is displayed in the display area 161. Accordingly, the images are displayed at the above-described time period.

FIG. 9 shows the case in which the images are displayed on the 9-frame display screen as described above with reference to FIG. 6. The images are displayed similar to the case described above with reference to FIG. 8 except the display time of each image is T/9 seconds instead of T/4 seconds, and explanations are thus omitted.

Figure 10:
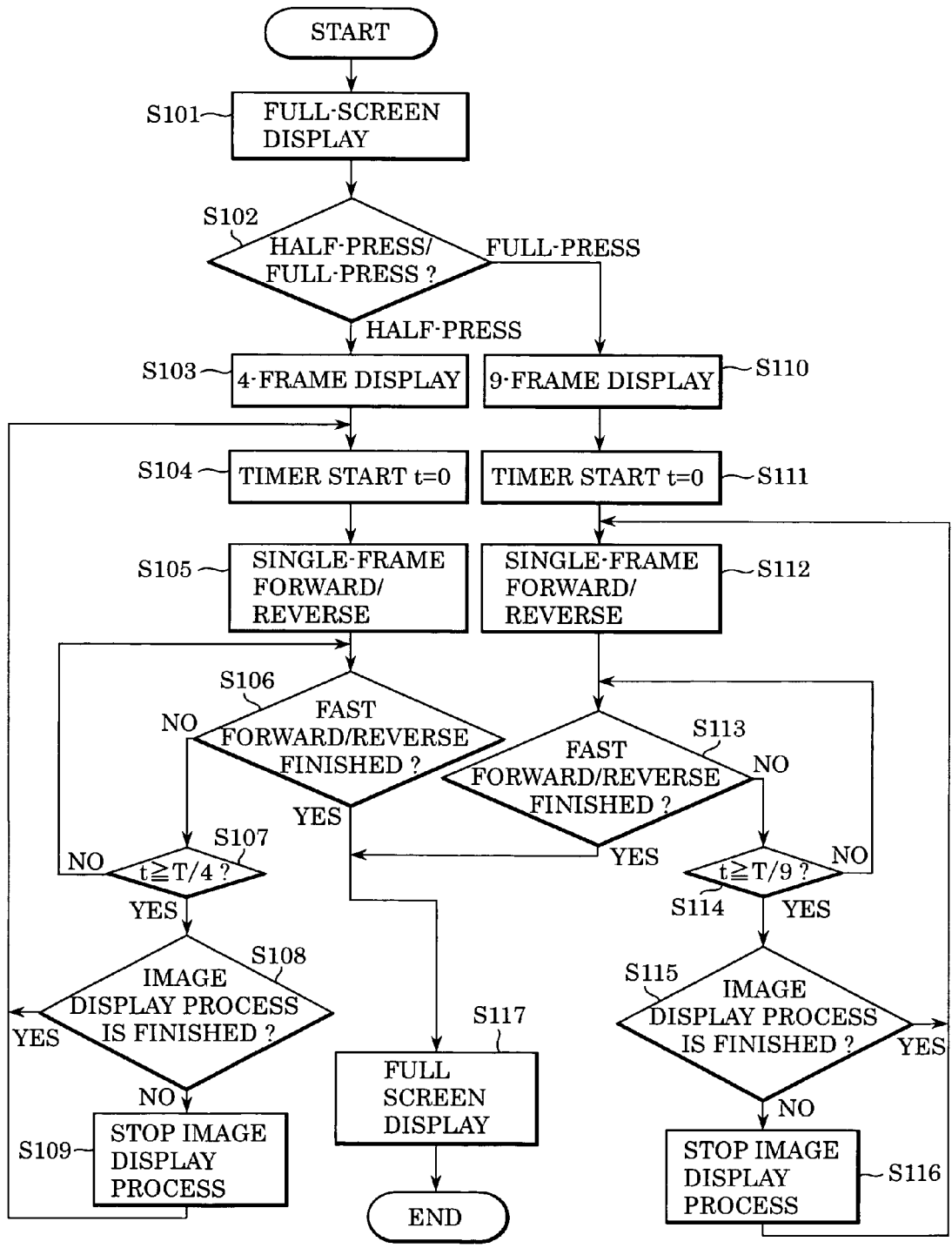
FIG. 10 is a flowchart of an image reproducing/displaying process similar to that shown in FIG. 7 except it includes a step performed when an image cannot be displayed on an N-frame display screen within a predetermined time.

FIG. 10 is a flowchart of an image reproducing/displaying process similar to that shown in FIG. 7 except it includes a step for when an image cannot be displayed on an N-frame display screen within a predetermined time.

In the flowchart shown in FIG. 10, Steps S101 to S107, S110 to S114, and S117 are similar to Steps S1 to S7, S8 to S12, and S13, respectively, in the flowchart shown in FIG. 7. Accordingly, the flowchart shown in FIG. 10 is obtained by adding Steps S108, S109, S115, and S116 to the flowchart shown in FIG. 7. In the following description, explanations of steps similar to those in the flowchart shown in FIG. 7 are omitted and the added steps are mainly explained.

When the low speed fast forward mode (or the low speed fast reverse mode) is selected, an image is displayed on the 4-frame display screen. Then, when the predetermined time, that is, T/4 seconds elapse (Steps S103 to S107), it is determined whether or not the image display process for the next image is finished (Step S108). If the image display process is finished, the process returns to Step S104, where the timer is restarted, and the next image is displayed in a predetermined display area of the 4-frame display screen (Step S105).

If it is determined that the image display process is not finished in Step S108, the image display process is canceled (Step S109) and the process returns to Step S104. With reference to FIG. 8, for example, if it is determined that the image display process for the display 52 is to be canceled in Step S109, the image display process for the next display 53 is started without displaying an image in the display area 162. Then, when the image display process for the display 53 is finished within T/4 seconds, the image 4 is displayed in the display area 163.

When the high speed fast forward mode (or the high speed fast reverse mode) is selected, an image is displayed on the 9-frame display screen. Then, when the predetermined time, that is, T/9 seconds elapse (Steps S110 to S114), it is determined whether or not the image display process for the next image is finished (Step S115). If the image display process is finished, the process returns to Step S111, where the timer is restarted, and the next image is displayed in a predetermined display area of the 9-frame display screen (Step S112).

If it is determined that the image display process is not finished in Step S115, the image display process is canceled (Step S116) and the process returns to Step S111. With reference to FIG. 9, for example, if it is determined that the image display process for the display 63 is to be canceled in Step S116, the image display process for the next display 64 is started without displaying an image in the display area 163. Then, when the image display process for the display 64 is finished within T/9 seconds, the image 5 is displayed in the display area 164.

In the foregoing description, the cases in which the images are fast forwarded or fast reversed by dividing the display screen into four or nine display areas are explained. However, the number of display areas into which the display screen is divided is not limited to them, and it may be any natural number N of two or more.

In addition, it is not necessary to set the display time (update time) for each of the reduced images constant, and the display time may also be increased as the sequence number increases as long as the total display time is fixed to T seconds.

In addition, in the present embodiment, M (M is an integer of 2 or more) reduced images may be displayed in the low speed fast forward mode and the low speed fast reverse mode and N (N>M) reduced images may be displayed in the high speed fast forward mode and the high speed fast reverse mode.

In addition, the method for reproducing images according to the present invention may also be realized as software executed by a computer.

The above-described preferred embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. An image reproducing apparatus comprising:
a selecting device configured to select one of a first image display mode and a second image display mode;
a reproducing unit configured to reproduce M number of reduced images from a memory if the first image display mode is selected, and reproduce N number of reduced images from the memory if the second image display mode is selected, where M is an integer equal to or greater than 2 and N is an integer greater than M; and
a display unit configured to display the M number of reduced images side by side in a predetermined T period if the first image display mode is selected, and display the N number of reduced images side by side in the predetermined T period if the second image display mode is selected, wherein each of the M reduced images is displayed in the order of the time of recording for each T/M period, and each of the N reduced images is displayed in the order of the time of recording for each T/N period.

2. An image reproducing apparatus comprising:
a selecting device configured to select one of a first image display mode and a second image display mode;
a reproducing unit configured to reproduce four reduced images from a memory if the first image display mode is selected, and reproduce nine reduced images from the memory if the second image display mode is selected; and
a display unit configured to display the four reduced images side by side in a predetermined T period if the first image display mode is selected, and display the nine reduced images side by side in the predetermined T period if the second image display mode is selected, wherein each of the four reduced images is displayed in the order of the time of recording for each T/4 period, and each of the nine reduced images is displayed in the order of the time of recording for each T/9 period.

3. A method for reproducing images, the method comprising:
selecting one of a first image display mode and a second image display mode;
reproducing M number of reduced images from a memory if the first image display mode is selected, where M is an integer equal to or greater than 2;
reproducing N number of reduced images from the memory if the second image display mode is selected, where N is an integer greater than M;

displaying the M number of reduced images side by side in a predetermined T period if the first image display mode is selected, wherein each of the M reduced images is displayed in the order of the time of recording for each T/M period; and displaying the N number of reduced images side by side in the predetermined T period if the second image display mode is selected, wherein each of the N reduced images is displayed in the order of the time of recording for each T/N period.

4. A method for reproducing images, the method comprising:

selecting one of a first image display mode and a second image display mode;

reproducing four reduced images from a memory if the first image display mode is selected;

reproducing nine reduced images from the memory if the second image display mode is selected;

displaying the four reduced images side by side in a predetermined T period if the first image display mode is selected, wherein each of the four reduced images is displayed in the order of the time of recording for each T/4 period; and displaying the nine reduced images side by side in the predetermined T period if the second image display mode is selected, wherein each of the nine reduced images is displayed in the order of the time of recording for each T/9 period.

5. The image reproducing apparatus according to claim 1, wherein the memory is a detachable memory.

6. The image reproducing apparatus according to claim 2, wherein the memory is a detachable memory.

7. The method according to claim 3, wherein the memory is a detachable memory.

8. The method according to claim 4, wherein the memory is a detachable memory.

9. An image reproducing apparatus comprising:

a selecting device configured to select one of a fast forward mode for fast forwarding images while displaying and a fast reverse mode for fast reversing images while displaying;

a reproducing unit configured to reproduce M number of reduced images from a memory when each of the modes is selected, where M is an integer equal to or greater than 2; and a display unit configured to display the M number of reduced images side by side in a predetermined T period if the fast forward mode is selected wherein each of the M reduced images is displayed in the order of the time of recording for each T/M period, and display the M number of reduced images side by side in the predetermined T period if the fast reverse mode is selected wherein each of the M reduced images is displayed in the opposite order to the order of the time of recording for each T/M period.

10. The image reproducing apparatus according to claim 9, wherein the memory is a detachable memory.

* * * * *